(12) United States Patent
Sakamoto et al.

(10) Patent No.: US 9,670,810 B2
(45) Date of Patent: Jun. 6, 2017

(54) EXHAUST GAS PURIFICATION SYSTEM

(71) Applicant: ISUZU MOTORS LIMITED, Tokyo (JP)

(72) Inventors: Takayuki Sakamoto, Fujisawa (JP); Daiji Nagaoka, Kamakura (JP)

(73) Assignee: ISUZU MOTORS LIMITED, Tokyo (JP)

(*) Notice: Subject to any disclaimer, the term of this patent is extended or adjusted under 35 U.S.C. 154(b) by 0 days.

(21) Appl. No.: 14/781,715

(22) PCT Filed: Mar. 5, 2014

(86) PCT No.: PCT/JP2014/055610
§ 371 (c)(1),
(2) Date: Oct. 1, 2015

(87) PCT Pub. No.: WO2014/162814
PCT Pub. Date: Oct. 9, 2014

(65) Prior Publication Data
US 2016/0061077 A1 Mar. 3, 2016

(30) Foreign Application Priority Data
Apr. 4, 2013 (JP) ................. 2013-078538

(51) Int. Cl.
*F01N 3/22* (2006.01)
*F01N 3/08* (2006.01)
(Continued)

(52) U.S. Cl.
CPC ......... *F01N 3/0885* (2013.01); *F01N 3/0842* (2013.01); *F01N 3/106* (2013.01);
(Continued)

(58) Field of Classification Search
CPC ...... F01N 3/023; F01N 3/0814; F01N 3/0842; F01N 3/0885; F01N 3/103; F01N 3/106;
(Continued)

(56) References Cited

U.S. PATENT DOCUMENTS

2005/0223698 A1* 10/2005 Murata ................. F01N 3/0814
60/286
2008/0183368 A1 7/2008 Morimoto et al.

FOREIGN PATENT DOCUMENTS

EP 1 087 122 3/2001
JP 11-223148 8/1999
(Continued)

OTHER PUBLICATIONS

Espacenet Bibliographic data, Publication No. 11-223148, published Aug. 17, 1999.
(Continued)

*Primary Examiner* — Jorge Leon, Jr.
(74) *Attorney, Agent, or Firm* — Staas & Halsey LLP

(57) ABSTRACT

An exhaust gas purification system which can suppress a decrease in engine torque during a desulfurization process applied to a NOx storage reduction catalyst. The system includes a NOx storage reduction catalyst in an exhaust pipe of an engine, and a desulfurization process control unit that controls an amount of intake air introduced to the engine to enrich the exhaust gas, and performs a desulfurization process to the NOx storage reduction catalyst. The desulfurization process control unit is configured to gradually reduce an amount of intake air when the desulfurization process is commenced.

8 Claims, 4 Drawing Sheets

(51) Int. Cl.
*F02D 41/02* (2006.01)
*F02D 41/18* (2006.01)
*F02D 41/00* (2006.01)
*F01N 3/10* (2006.01)
*F02D 41/14* (2006.01)
*F01N 9/00* (2006.01)

(52) U.S. Cl.
CPC ....... *F02D 41/0002* (2013.01); *F02D 41/028* (2013.01); *F02D 41/1482* (2013.01); *F02D 41/18* (2013.01); *F01N 9/002* (2013.01); *F01N 2570/14* (2013.01); *F02D 41/029* (2013.01); *F02D 2041/1422* (2013.01); *F02D 2250/21* (2013.01); *Y02T 10/42* (2013.01)

(58) Field of Classification Search
CPC ............... F01N 13/009; F01N 2250/14; F01N 2430/06; F01N 2560/07; F01N 2570/04; F01N 2900/0408; F01N 2900/0412; F01N 2900/0422; F01N 2900/08; F02D 41/028; F02D 41/029; F02D 41/18; F02D 2250/32; Y02T 10/42
USPC ......... 60/285, 295, 297, 299, 300, 301, 311, 60/320
See application file for complete search history.

(56) References Cited

FOREIGN PATENT DOCUMENTS

| | | |
|---|---|---|
| JP | 3334592 B2 * | 10/2002 |
| JP | 2010-90711 | 4/2010 |
| JP | 2011-157892 | 8/2011 |

OTHER PUBLICATIONS

Espacenet Bibliographic data, Publication No. 2011-157892, published Aug. 18, 2011.
Patent Abstracts of Japan, Publication No. 2010-90711, published Apr. 22, 2010.
International Search Report mailed Apr. 1, 2014, in corresponding International Application No. PCT/JP2014/055610.
PCT International Preliminary Report on Patentability dated Oct. 6, 2015 in corresponding International Patent Application No. PCT/JP2014/055610.
Supplemental Search Report dated Nov. 8, 2016 in European Application No. 14780147.6.
U.S. Appl. No. 14/781,715, Oct. 1, 2015, Sakamoto et al., Isuzu Motors Limited.

* cited by examiner

EXHAUST GAS PURIFICATION SYSTEM

CROSS-REFERENCE TO RELATED APPLICATIONS

This application is a U.S. National Stage Application, which claims the benefit under 35 U.S.C. §371 of PCT International Patent Application No. PCT/JP2014/055610, filed Mar. 5, 2014, which claims the foreign priority benefit under 35 U.S.C. §119 of Japanese Patent Application No. 2013-078538, filed Apr. 4, 2013, the contents of which are incorporated herein by reference.

TECHNICAL FIELD

The present invention relates to an exhaust gas purification system that uses a NOx storage reduction catalyst (Lean NOx Trap).

BACKGROUND ART

When an exhaust gas purification system uses a NOx storage reduction catalyst or a lean NOx trap (hereinafter, referred to as "LNT catalyst"), sulfur dioxide in an exhaust gas, which is primarily derived from fuel, is absorbed by the LNT catalyst and a NOx purification rate decreases. In order to avoid such decrease in the NOx purification rate, it is necessary to periodically perform a desulfurization process (sulphur purge process). The desulfurization process brings the exhaust gas into a rich condition, i.e., a condition of low oxygen concentration, to remove sulfur dioxide, which is absorbed by the LNT catalyst.

The desulfurization process requires high temperature. Thus, if the desulfurization process is applied to a vehicle that has a DPF (diesel particulate filter) configured to collect PM (particulate matter) contained in an exhaust gas, the DPF regeneration process is usually carried out (i.e., PM collected by the DPF is burned and removed with the high temperature exhaust gas) prior to the desulfurization process.

LISTING OF REFERENCES

PATENT LITERATURE 1: Japanese Patent Application Laid-Open Publication (Kokai) No. 2011-157892
PATENT LITERATURE 2: Japanese Patent Application Laid-Open Publication (Kokai) No. 2010-90711

The above-described conventional exhaust gas purification system performs the DPF regeneration process in a lean condition (i.e., a condition of high oxygen concentration) and then performs the desulfurization process in a rich condition, which is prepared by steeply reducing an amount of intake air. Therefore, it results in a decrease in the engine torque due to the steep decrease in the intake air amount. This brings about a problem, i.e., it becomes a cause of deteriorating the drivability, such as slow acceleration response and clumsiness.

More specifically, as shown in FIG. 4 of the accompanying drawings, the DPF regeneration process is performed while the vehicle (engine) is running in a normal lean condition. Thus, an EGR (exhaust gas recirculation) valve to adjust a flow rate of the exhaust gas recirculated to the intake pipe is controlled by an open loop control. Accordingly, there is a substantial gap between an actual amount of intake air and a target (desired or intended) amount of intake air. The target amount of intake air is a target value when controlling an amount of intake air.

In the desulfurization process, the exhaust gas should be in a rich condition, i.e., in an oxygen-short condition (condition of insufficient oxygen). Thus, the control is executed such that the target amount of intake air (target intake air amount) is lowered, and the target intake air amount becomes equal to an actual intake air amount. The process for reducing the intake air amount is carried out. Accordingly, the control for reducing the intake air amount toward the target intake air amount is carried out instantaneously (immediately) upon commencement of the desulfurization process, from a condition that the actual intake air amount is deviated from the target intake air amount. As a result, the intake air amount steeply decreases upon commencement of the desulfurization process, and the combustion in the engine becomes improper instantaneously. This brings about a decrease in the torque.

It should be noted that there is a gap between the target intake air amount and an actual intake air amount during a normal running condition of the engine to a certain extent. Thus, the same problem arises when the DPF regeneration process is not performed and the desulfurization process is performed with the LNT catalyst having elevated temperature.

SUMMARY OF THE INVENTION

The present invention is proposed in consideration of the above-described problems, and an object of the present invention is to provide an exhaust gas purification system that can suppress the decrease in the engine torque when the desulfurization process is applied to the NOx storage reduction catalyst.

The present invention is developed to achieve the above-mentioned object, and is directed to an exhaust gas purification system that includes a NOx storage reduction catalyst disposed in an exhaust pipe of an engine, and a desulfurization process control unit that controls an amount of intake air introduced to the engine to bring an exhaust gas in a rich condition, and performs a desulfurization process in the NOx storage reduction catalyst. The desulfurization process control unit is configured to gradually reduce an amount of intake air when the desulfurization process starts.

The desulfurization process control unit may include a target intake air amount calculating unit configured to obtain a target intake air amount (target amount of intake air) on the basis of engine parameters of the engine, a coefficient map of changing rate that defines (decides, sets) a coefficient of changing rate in accordance with deviation between the target intake air amount and an actual intake air amount and time elapsing from the start of the desulfurization process, a transitional target intake air amount calculating unit configured to obtain a transitional target intake air amount by multiplying the target intake air amount, which is obtained by the target intake air amount calculating unit, by the coefficient of changing rate, which is obtained from the coefficient map, and an intake air amount control unit configured to control the intake air amount (amount of intake air) such that the intake air amount introduced to the engine becomes equal to the transitional target intake air amount, which is obtained by the transitional target intake air amount calculating unit.

The coefficient map of changing rate may set the coefficient of changing rate such that the transitional target intake air amount coincides with the intake air amount to be introduced to the engine when the desulfurization process starts.

The present invention provides an exhaust gas purification system that is able to suppress the decrease in the engine torque when the desulfurization process is applied to the NOx storage reduction catalyst.

DETAILED DESCRIPTION

Embodiments of the present invention will now be described with reference to the accompanying drawings.

Figure 1:
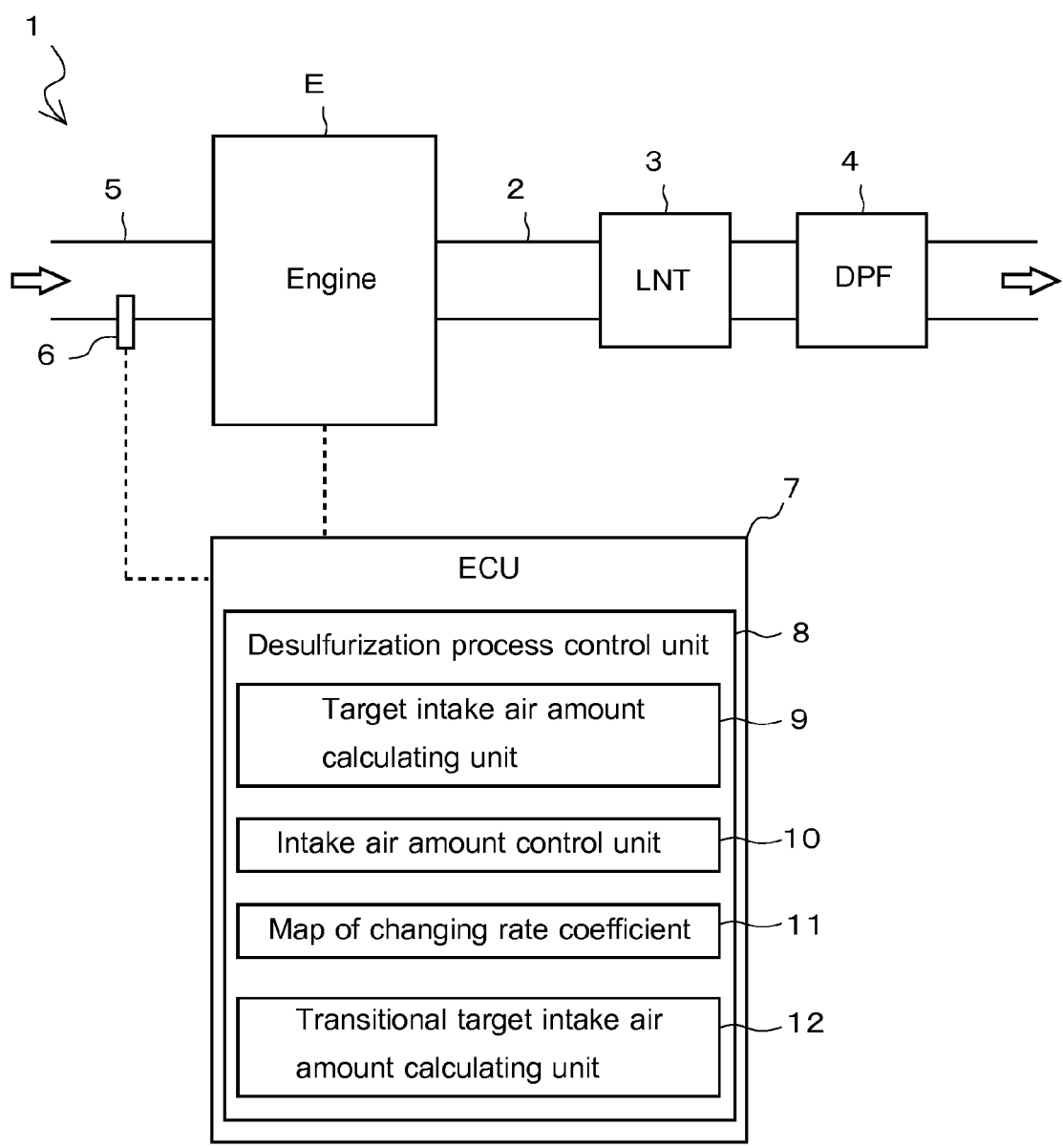
FIG. 1 shows a schematic configuration of an exhaust gas purification system according to an embodiment of the present invention.

FIG. 1 illustrates a schematic configuration of an exhaust gas purification system according to an embodiment of the present invention.

As illustrated in FIG. 1, the exhaust gas purification system 1 includes a NOx storage reduction catalyst or a lean NOx trap (LNT) catalyst 3, provided in an exhaust pipe 2 of an engine E, and a desulfurization process control unit 8 for controlling an amount of intake air introduced to the engine E to bring the exhaust gas in a rich condition, and carry out a desulfurization process (S purge process) to the LNT catalyst 3.

A DPF 4 is disposed on the exhaust pipe 2 downstream of the LNT catalyst 3 to collect (trap) PM contained in the exhaust gas. Although not shown in the drawings, a diesel oxidation catalyst (DOC) may be disposed on the exhaust pipe 2 upstream of the LNT catalyst 3. An MAF (mass air flow) sensor 6 is attached to an intake air pipe 5 of the engine E to measure an amount of intake air.

The desulfurization process control unit 8 is included in an electric control unit (ECU) 7 of a vehicle. In this embodiment, the desulfurization process control unit 8 is configured to carry out the desulfurization process after the DPF regeneration process.

The desulfurization process control unit 8 includes a target intake air amount calculating unit 9 for obtaining a target intake air amount (target amount of intake air) on the basis of engine parameters of the engine E, and an intake air amount control unit 10 for controlling the intake air amount such that the intake air amount of the engine E becomes equal to the target intake air amount, which is obtained by the target intake air amount calculating unit 9. The target intake air amount calculating unit 9 and the intake air amount control unit 10 are known in the art. The intake air amount control unit 10 is configured to execute feedback control such that an actual intake air amount becomes equal to the target intake air amount when the desulfurization process is performed.

In the exhaust gas purification system 1 of this embodiment, the desulfurization process control unit 8 is configured to gradually decrease the intake air amount when the desulfurization process is commenced.

Specifically, the desulfurization process control unit 8 also has a map 11 of coefficients of rate-of-change, and a transitional target intake air amount calculating unit 12. The coefficient map 11 indicates a coefficient of changing rate, which is decided by a deviation between the target intake air amount and the actual intake air amount and time counted from the start of the desulfurization process. The transitional target intake air amount calculating unit 12 multiplies the target intake air amount, which is obtained by the target intake air amount calculating unit 9, by the coefficient of the changing rate, which is obtained from the coefficient map 11, to obtain a transitional target intake air amount. The desulfurization process control unit 8 is configured to control the intake air amount on the basis of the transitional target intake air amount when the desulfurization process is commenced.

In this embodiment, the intake air amount control unit 10 is configured to control the intake air amount such that the intake air amount of the engine E becomes equal to the transitional target intake air amount, which is obtained by the transitional target intake air amount calculating unit 12, when the desulfurization process is commenced.

In other words, the desulfurization process control unit 8 of the exhaust gas purification system 1 is configured to control the intake air amount, using the transitional target intake air amount, such that the actual intake air amount does not steeply decrease when there is a large deviation (gap) between the target intake air amount and the actual intake air amount. The transitional intake air amount is calculated by multiplying the target intake air amount by the coefficient of changing rate.

The coefficient of changing rate is decided (set) such that the coefficient approaches one as the time elapsing from the start of the desulfurization process increases, i.e., such that the transitional target intake air amount gently approaches the target intake air amount as the time elapses from the start of the desulfurization process.

In addition, the coefficient of changing rate becomes large as the deviation between the target intake air amount and the actual intake air amount is large, i.e., as a value obtained by subtracting the target intake air amount from the actual intake air amount is large. The coefficient of changing rate is set to a value which is equal to or greater than one.

Also, in this embodiment, the changing rate coefficient map 11 sets the coefficient such that the transitional target intake air amount coincides with the intake air amount introduced to the engine E when commencing the desulfurization process. As such, the transitional target intake air amount becomes equal to the actual intake air amount upon commencement of the desulfurization process in the exhaust gas purification system 1. Accordingly, it is possible to reduce or avoid the decrease in the engine torque, which would otherwise be caused by the steep decrease in the intake air amount upon commencement of the desulfurization process.

The transitional target intake air amount is a provisional target intake amount, which is temporarily used when the desulfurization process starts. After the intake air amount decreases, the control (processing) for the intake air amount should be switched to the ordinary processing, i.e., the control for the intake air amount should be switched such that the actual intake air amount coincides with the target intake air amount.

In this embodiment, when the coefficient of changing rate becomes one, i.e., when the transitional target intake air amount coincides with the target intake air amount, it is determined that the intake air amount has sufficiently decreased. After that, the processing is switched to the ordinary processing.

Specifically, in this embodiment, the intake air amount control unit 10 is configured to carry out the processing such that the intake air amount coincides with the transitional target intake air amount till the coefficient of changing rate reaches one. After the coefficient of changing rate reaches one, the intake air amount control unit 10 is configured to carry out the processing such that the intake air amount coincides with the transitional target intake air amount. Time from the commencement of the desulfurization process to the switching to the ordinary processing may be, for example, several seconds. This time depends upon the deviation between the target intake air amount and the actual intake air amount when the desulfurization process is commenced.

Although the coefficient of changing rate is monitored to switch the processing to the ordinary processing in the above-described embodiment, the present invention is not limited in this regard. For example, the processing may be switched to the ordinary processing when time counted from the start of the desulfurization process reaches a predetermined value.

Figure 2:
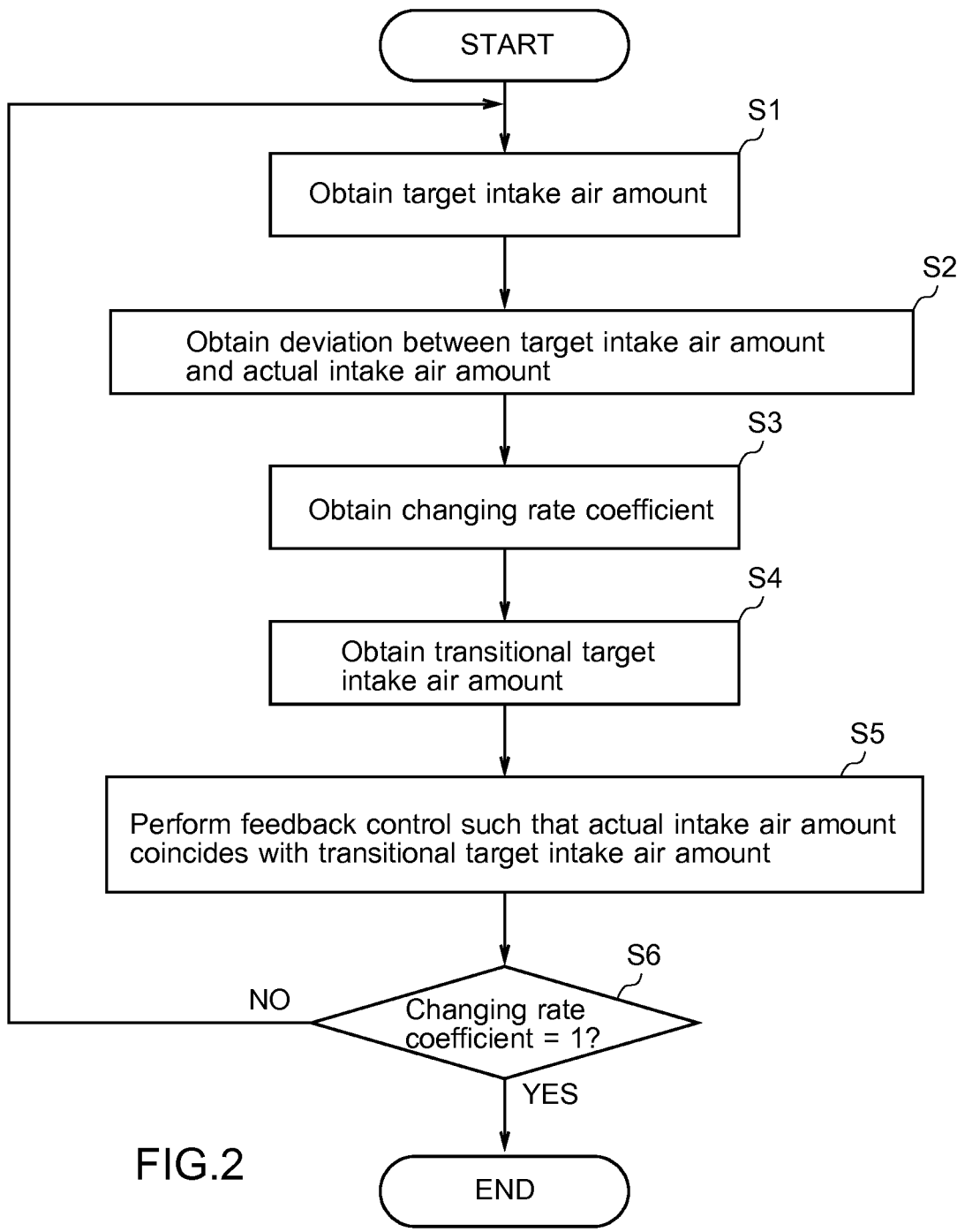
FIG. 2 is a flowchart of processing to be executed when a desulfurization process starts in the embodiment of the present invention.

Referring now to FIG. 2, the control (processing) upon commencement of the desulfurization process will be described.

Firstly, at Step S1, as shown in FIG. 2, when the DPF regeneration process is finished and the desulfurization process starts, the target intake air amount calculating unit 9 obtains a target intake air amount on the basis of engine parameters entered to the ECU 7.

Subsequently, the transitional target intake air amount calculating unit 12 obtains the deviation between the target intake air amount, which is obtained at Step S1, and the actual intake air amount, which is measured by the MAF sensor 6 (Step S2). The transitional target intake air amount calculating unit 12 then refers to the coefficient map 11, using the deviation obtained at Step S2 and the time that has elapsed from the start of the desulfurization process, and obtains a coefficient of changing rate (Step S3).

Subsequently, the transitional target intake air amount calculating unit 12 multiplies the target intake air amount, which is obtained at Step S1, by the coefficient of changing rate, which is obtained at Step S3, to obtain the transitional target intake air amount (Step S4).

Then, the intake air amount control unit 10 feedback controls the intake air amount such that the actual intake air amount, which is measured by the MAF sensor 6, coincides with the transitional target intake air amount, which is obtained at Step S4 (Step S5).

At Step S6, the intake air amount control unit 10 determines whether or not the coefficient of changing rate is one. If the determination at Step S6 is NO, then the control returns to Step S1 to continue the processing to be applied when the desulfurization process starts. If the determination at Step S6 is YES, the processing to be applied when the desulfurization process starts is finished, and the ordinary processing is carried out such that the actual intake air amount becomes equal to the target intake air amount.

Figure 3:
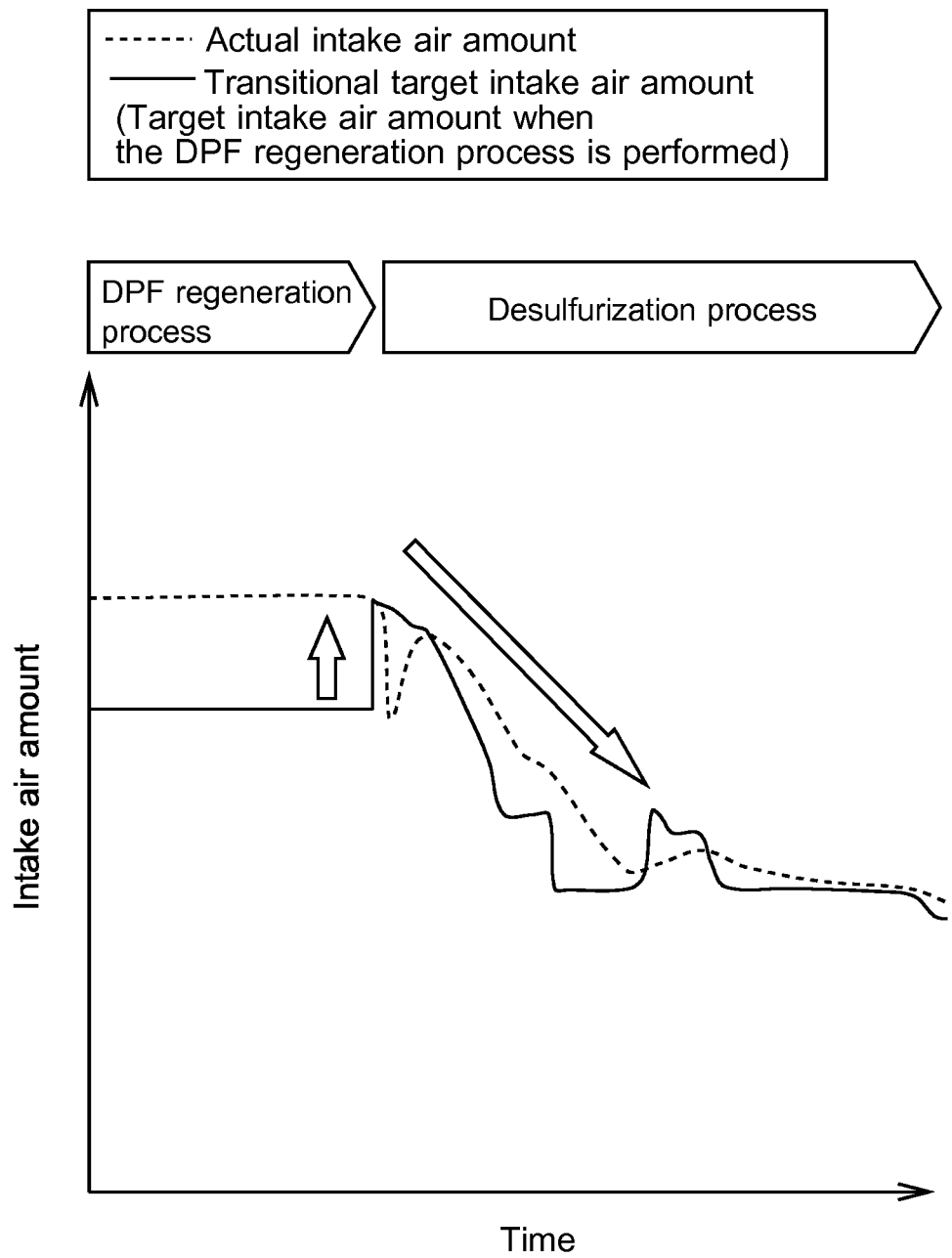
FIG. 3 is a graph showing exemplary relation between an amount of intake air and a transitional target amount of intake air over time when the desulfurization process is performed by the exhaust gas purification system shown in FIG. 1.
Figure 4:
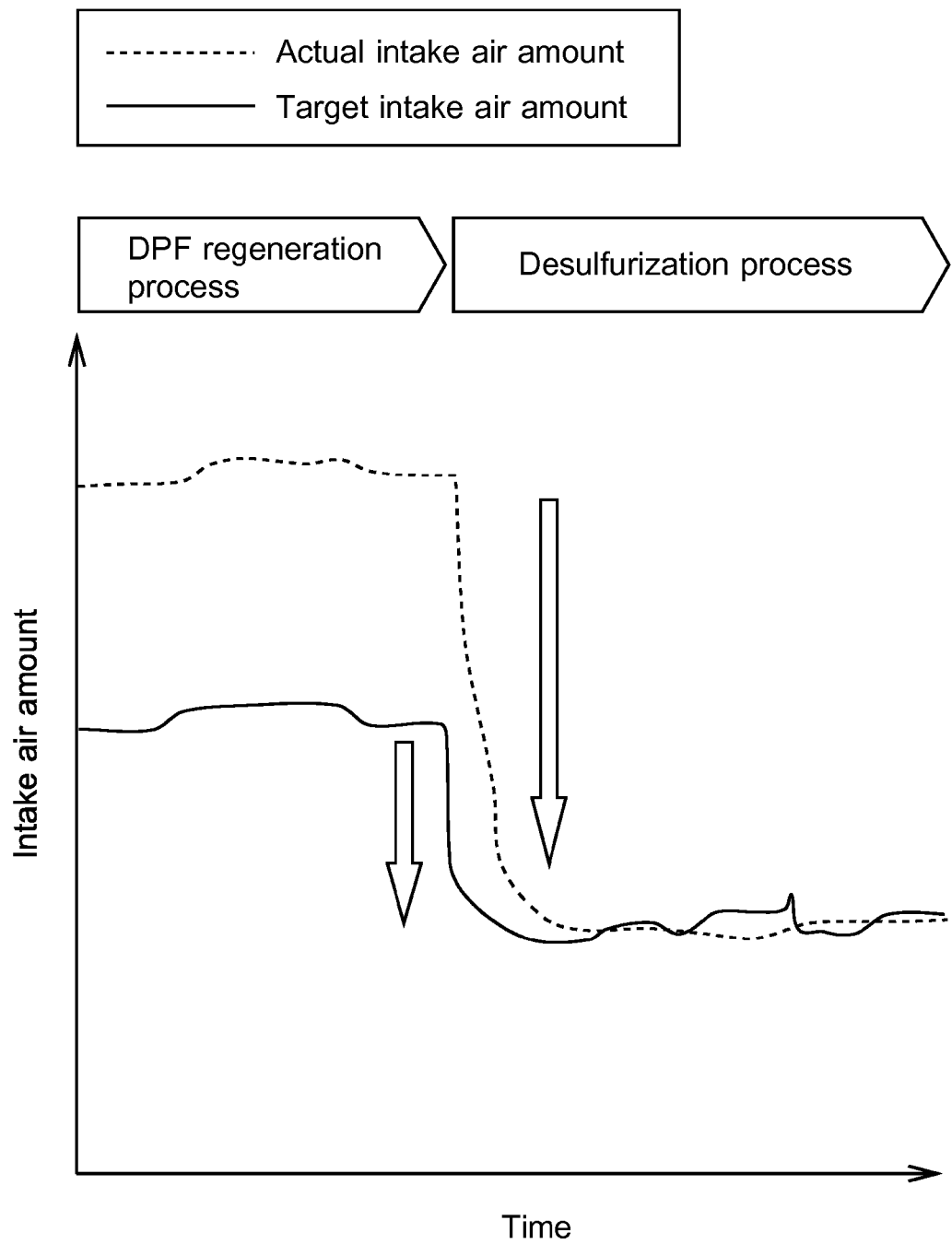
FIG. 4 is a graph showing exemplary relation between an amount of intake air and a target amount of intake air over time when the desulfurization process is performed by a conventional exhaust gas purification system.

FIG. 3 shows exemplary relation between the intake air amount and the transitional target intake air amount over time when the desulfurization process is carried out in (by) the exhaust gas purification system 1 of this embodiment.

As shown in FIG. 3, in the exhaust gas purification system 1 of this embodiment, the transitional target intake air amount is set to the actual intake air amount upon commencement of the desulfurization process. After that, the transitional target intake air amount gradually decreases over time.

Because the actual intake air amount is controlled to become equal to the transitional target intake air amount, the actual intake air amount gradually decreases with the elapsing time as the transitional target intake air amount decreases. After that, when the transitional target intake air amount coincides with the target intake air amount (i.e., when the coefficient of changing rate becomes one), the processing is switched to the ordinary processing.

As described above, the desulfurization process control unit 8 of the exhaust gas purification system 1 according to this embodiment is configured to gradually decrease the intake air amount when starting the desulfurization process.

The major cause of decreasing the torque of the engine E during the desulfurization process is the steep decrease in the amount of intake air introduced to the engine E in a short period of time. Thus, if the intake air amount is controlled such that the intake air amount is gradually decreased in the above-described embodiment, the steep decrease in the amount of intake air is suppressed, and it is possible to suppress the decrease of the engine torque (torque fluctuation) when the desulfurization process is applied to the LNT catalyst 3. As a result, it is possible to suppress the deterioration of the drivability when the desulfurization process is applied to the LNT catalyst 3. It is possible to carry out the desulfurization process in a reliable manner while maintaining the running condition without uncomfortable feeling, as compared to the ordinary running condition.

It should be noted that the present invention is not limited to the above-described embodiment. Various changes and modifications may be made to the above-described embodiment without departing from the spirit and the scope of the present invention.

For example, although the transitional target intake air amount is calculated by multiplying the target intake air amount by the coefficient of changing rate in the above-described embodiment, the method of deciding the transitional target intake air amount is not limited to the method described in the embodiment.

Various methods can be used to decide the transitional target intake air amount. For example, a method of deciding the transitional target intake air amount may include setting the actual intake air amount to the transitional target intake air amount upon starting the desulfurization process, and then gradually decreasing the transitional target intake air amount to the target intake air amount at a fixed rate. Alternatively, the method of deciding the transitional target intake air amount may include setting the transitional target intake air amount between the actual intake air amount and the target intake air amount.

Although the above-described embodiments deals with the vehicle that has the DPF 4, the present invention can be applied to the vehicle that does not have the DPF 4.

What is claimed is:
1. An exhaust gas purification system comprising:
a NOx storage reduction catalyst disposed in an exhaust pipe of an engine; and
an electronic control unit configured to:
control an intake air amount introduced to the engine to bring an exhaust gas to a rich condition;
perform a desulfurization process to the NOx storage reduction catalyst by gradually decreasing the intake air amount when the desulfurization process is commenced;

determine a target intake air amount based on operation parameters of the engine;

determine, based on a coefficient map of changing rate, a coefficient of changing rate in accordance with a deviation between the target intake air amount and an actual intake air amount, and time elapsing from when the desulfurization process is commenced;

determine a transitional target intake air amount by multiplying the target intake air amount by the coefficient of the changing rate; and control the intake air amount introduced to the engine to become equal to the transitional target intake air amount.

2. The exhaust gas purification system according to claim 1, wherein the coefficient map of changing rate sets the coefficient of the changing rate such that the transitional target intake air amount coincides with the intake air amount introduced to the engine when the desulfurization process is commenced.

3. The exhaust gas purification system according to claim 1 further comprising:

a filter disposed on the exhaust pipe of the engine downstream of the NOx storage reduction catalyst, wherein the electronic control unit is further configured to perform the desulfurization process after a regeneration process is performed on the filter.

4. The exhaust gas purification system according to claim 3 further comprising:

an oxidation catalyst disposed on the exhaust pipe of the engine upstream of the NOx storage reduction catalyst.

5. The exhaust gas purification system according to claim 1, wherein the NOx storage reduction catalyst is a lean NOx trap.

6. The exhaust gas purification system according to claim 1, wherein the engine is a diesel engine.

7. The exhaust gas purification system according to claim 6, further comprising a diesel particulate filter on the exhaust pipe.

8. The exhaust gas purification system according to claim 1, wherein the electronic control unit stops the gradually decreasing the intake air amount when the coefficient of the changing rate becomes one.

* * * * *